UNITED STATES PATENT OFFICE.

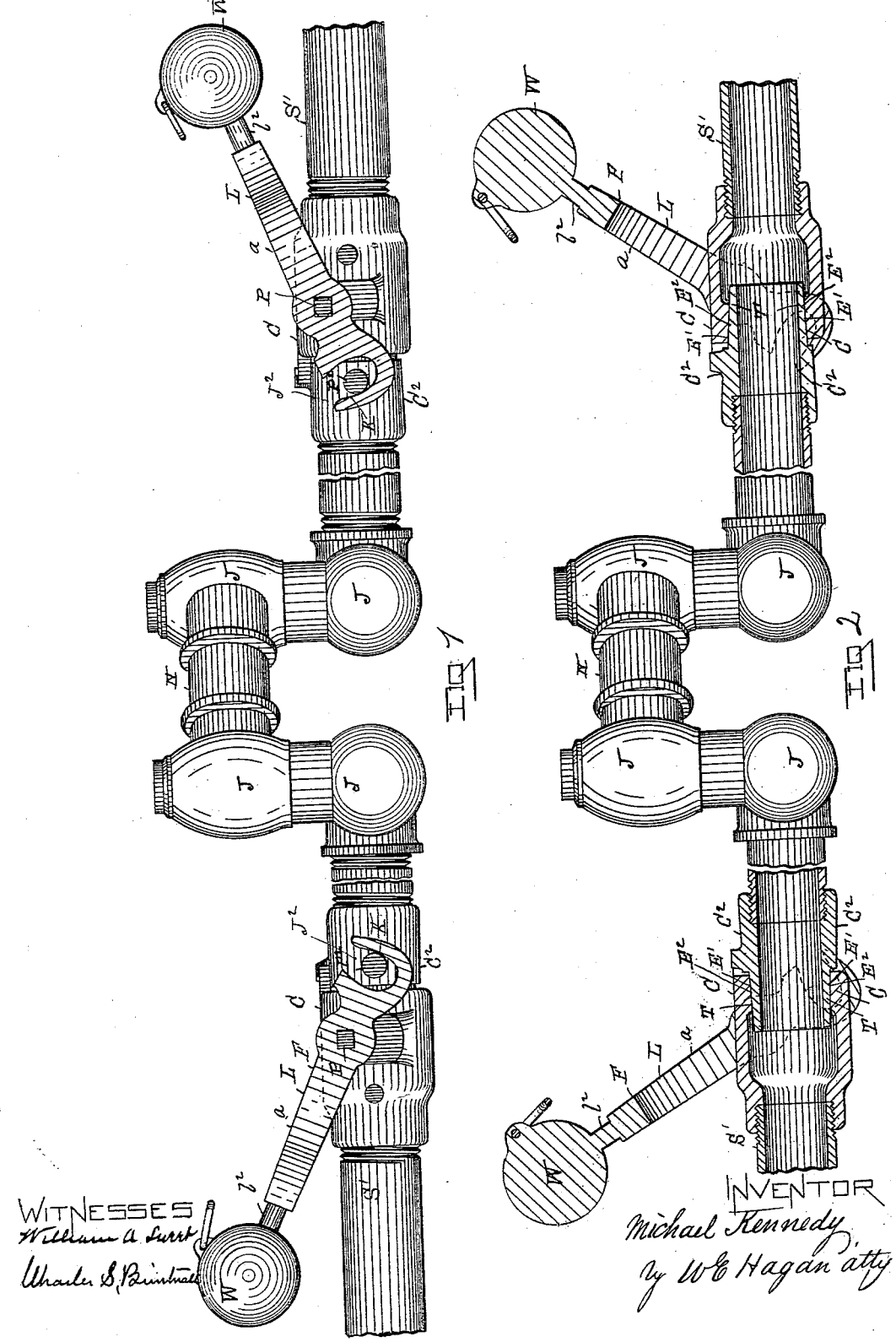

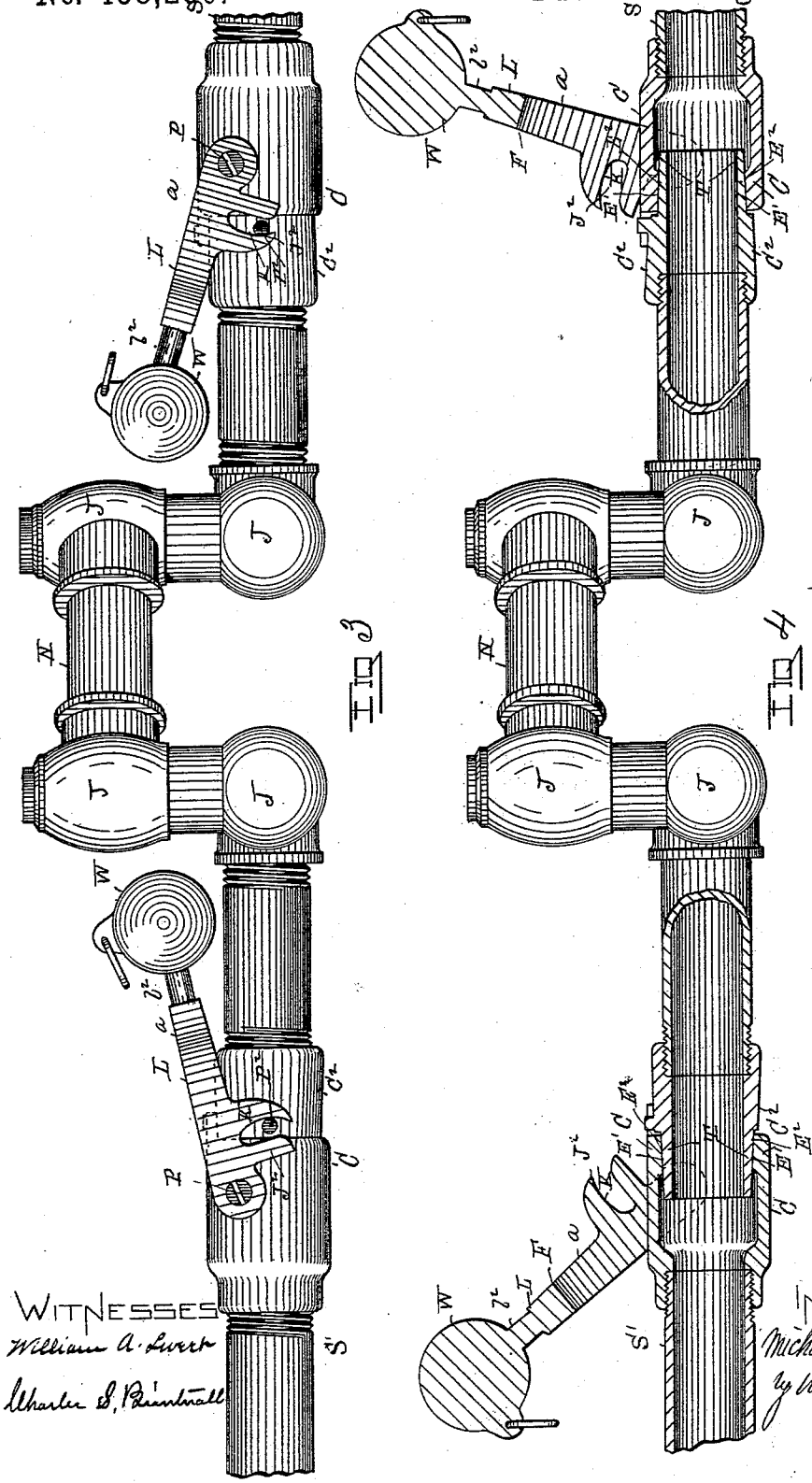

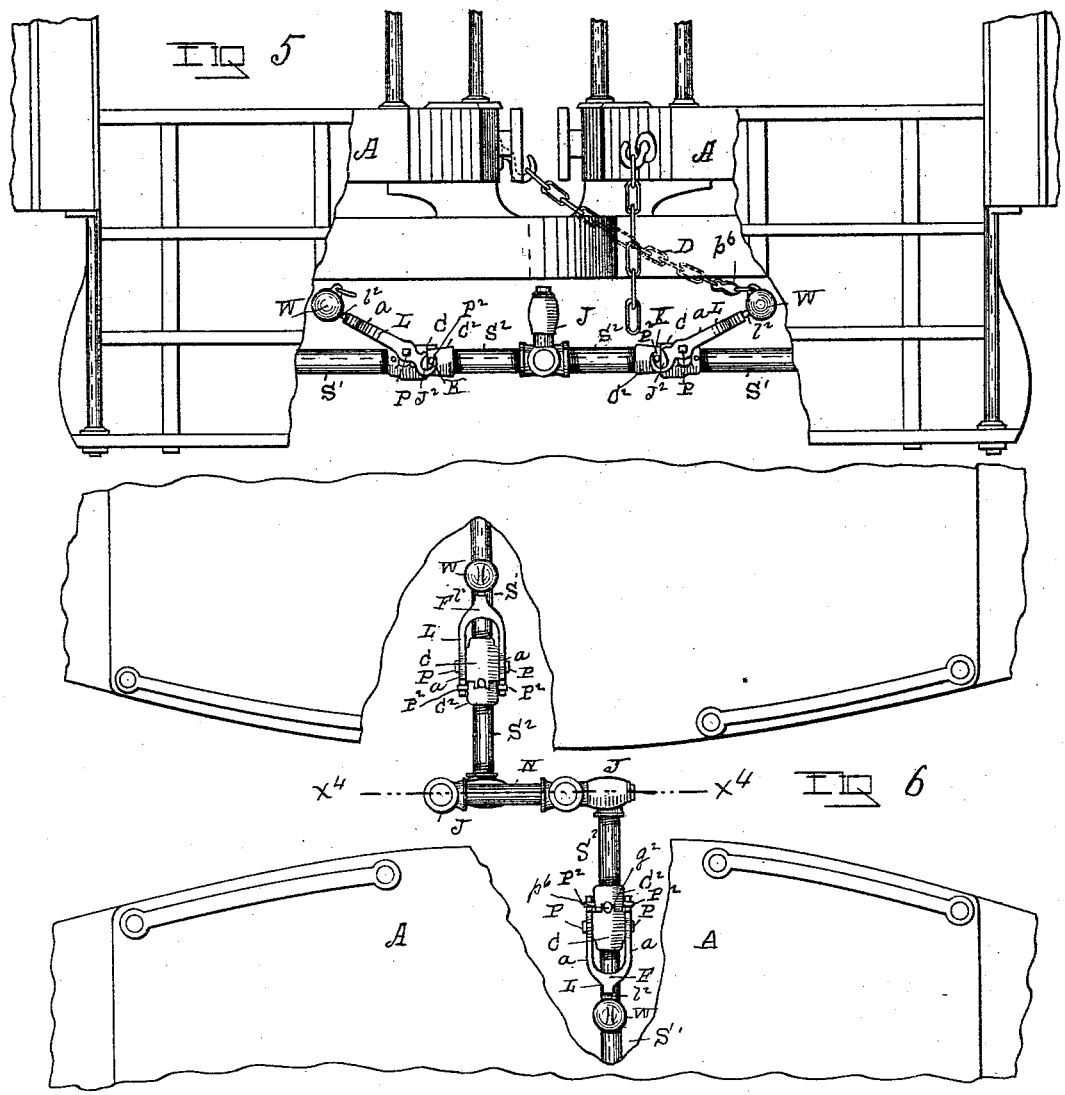

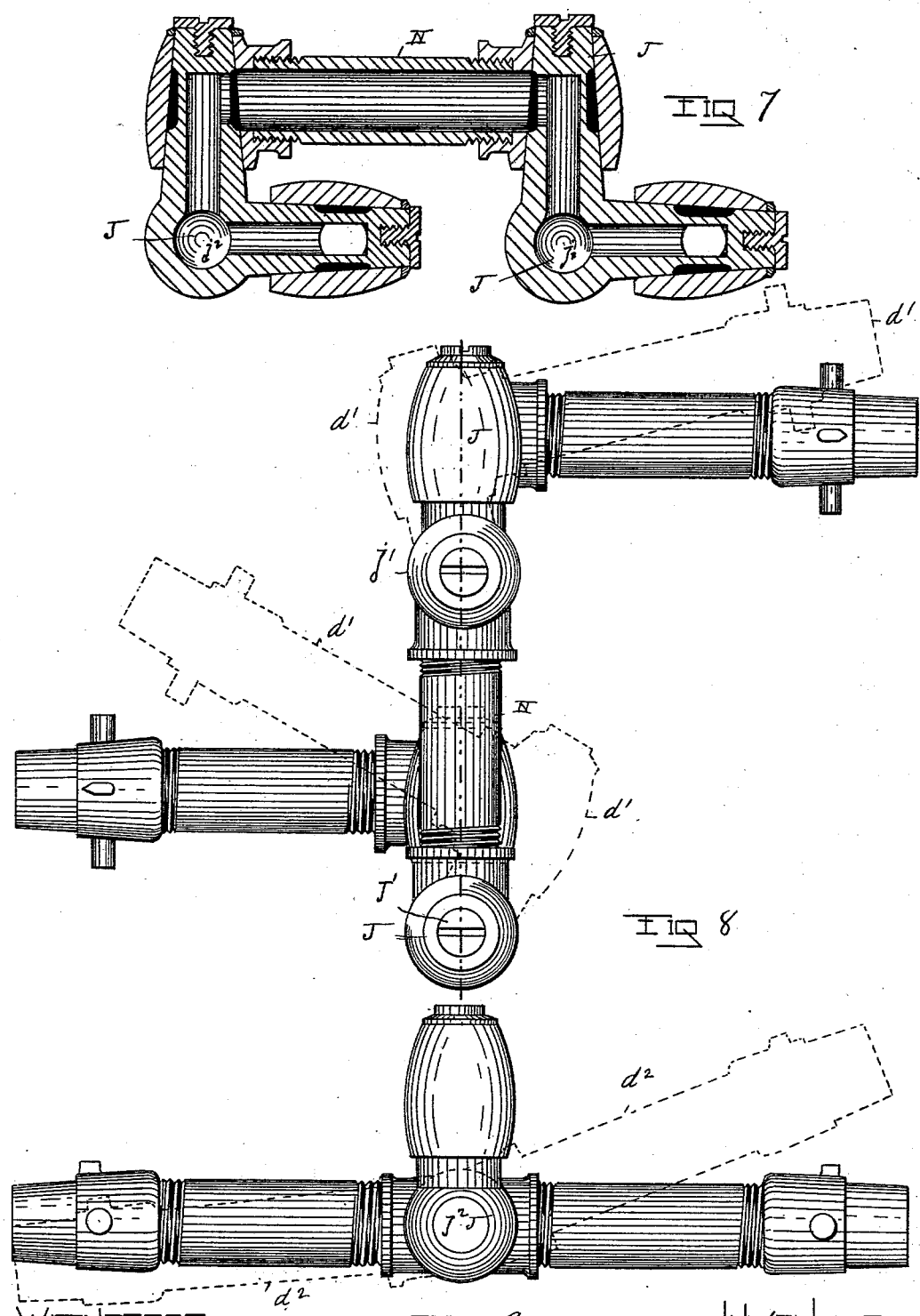

MICHAEL KENNEDY, OF TROY, NEW YORK.

COUPLING FOR RAIL-CAR STEAM-HEATING PIPES.

SPECIFICATION forming part of Letters Patent No. 458,250, dated August 25, 1891.

Application filed August 31, 1889. Serial No. 322,535. (No model.)

*To all whom it may concern:*

Be it known that I, MICHAEL KENNEDY, of the city of Troy, county of Rensselaer, and State of New York, have invented a new and useful Improvement in Couplings for Rail-Car Steam-Heating Pipes, of which the following is a specification.

My invention relates to couplers for connecting the steam-pipes used for heating railway-cars; and my invention has for its object to render them efficient for the purpose designed and to reduce the cost of their production.

My invention consists (as will be more fully detailed hereinafter in connection with its illustration) in the combination, with a receiving cup-shaped coupler part arranged on the steam-heating pipe at each end of the cars of a train, of an entering coupler part the exterior surface of which is just enough conical in form to engage with the outwardly-expanding interior surface of the receiving coupler part when entered therein and to make a steam-tight connection therewith, said coupler parts being operated to engage by a pivoted weighted lever arranged on the receiving coupler part having jaws thereon and a pin upon each side of the entering coupler part, the inner side of said jaws making a cam engagement with the pins upon the opposite sides of the entering part to force the latter to its seat within the expanding end of the receiving coupler part, there being used in connection with a receiving coupler part at each end of the car a short pipe having upon each of its ends an entering coupler part and between its ends whereon the latter are placed an adjustable joint.

Accompanying this specification to form a part of it there are four plates of drawings containing nine figures, with the same designation of parts by letter reference used in all of them.

In the illustrations, Figure 1 shows a side elevation of a steam-pipe connection containing my invention. Fig. 2 shows a section taken vertically and centrally through the coupler parts and the connecting steam-pipes, with the intermediate short steam-pipe and its adjustable joint broken off and shown in side elevation. In this figure the weighted lever is shown as raised on its weighted end to disconnect the parts. Fig. 3 shows in side elevation the same parts that are shown in Fig. 1, but illustrating a modification, in which the weighted levers have their weighted ends projected toward each other instead of oppositely from each other, as in Figs. 1 and 2. Fig. 4 shows a section taken centrally and vertically through the coupler parts and the connecting steam-pipes shown in Fig. 3, with part of the short intermediate steam-pipe and the adjustable joint thereon illustrated in side elevation, and with the weighted lever moved back from its engagement with the pin on the entering part of the coupler for disconnection. Fig. 5 shows a side elevation of part of the ends of a car, the steam-heating pipes at the approaching ends thereof and with my coupler applied to connect the short pipe therewith. Fig. 6 shows a top view of the parts illustrated at Fig. 5. Fig. 7 is a vertical section of the parts composing the joint made in the short pipe and its connections, taken on the line $x^4 x^4$ of Fig. 6. Fig. 8 is a top view of the same, dotted lines $d'$ indicating the lateral adjustable movement of the parts. Fig. 9 is a side elevation of the same, dotted lines $d^2$ indicating the vertical adjustment.

The several parts of the mechanism thus illustrated are designated by letter-reference and the function of the parts is described as follows:

The letters $S'$ designate the steam-heating pipes used to convey steam for heating the cars, and $S^2$ a short pipe having an adjustable joint J, which will be described more fully hereinafter.

The letter C designates a coupler-receiving part, which has a cup-shaped or outwardly-expanded interior surface $E'$.

The letter L designates a lever, which is bifurcated or forked at F, so as to produce the two arms $a\,a$, which straddle said coupler part C, as shown at Fig. 6.

The letter P designates a trunnion-formed pivot, which journals into the arms $a\,a$ and on which the lever operates.

The letter $J^2$ designates a jaw, having the cam-surface K arranged upon each of the arms $a\,a$, and the letter $l^2$ designates the outer end of the lever L, which is weighted at W.

The letter $C^2$ designates the entering coupler part, which at its entering end T has a conical surface $E^2$, the pitch of which corresponds in taper to the expanding interior surface of the coupler part C, so that when the coupler part C enters the coupler part C² and is thereat forced to contact the surfaces E' and E² make a steam-tight engagement.

The letters P² designate a pin arranged on each of the opposite sides of the coupler part C². As thus made, when the coupler part C² has entered the coupler part C and the weighted lever L operates the jaws J² to grasp the pins P² the cam-surfaces K thereon engage with said pins and force the oppositely-tapering surfaces E' E² to engage and make a steam-tight connection.

The letter $g^2$ designates a guide-slot made on the end of the coupler part C², and $p^6$ a guide-pin on the coupler part C.

The letters A designate the car ends, and D a chain passing from one of the weighted lever-arms L to the end of the car which is opposite, having a pinch-link connecting said chain with the weighted arm of the lever, so arranged that when the cars are uncoupled and the steam shut off the moving car will pull on the chain to disconnect the coupler parts and then pull out of the pinch-link.

The adjustable joint shown at J as made in the short pipe S² is not my invention, and I make no claim thereto apart from it as forming an adjustable connection, in combination with a short pipe fitted with one of my coupler parts at each end and a steam-pipe having on its end one of my connecting coupler parts. The function of the adjustable joint is to allow the parts to adjust to the rise and fall of the car ends and the movement of the latter in passing curves in the track.

This well-known method of making an adjustable joint is accomplished by ball-and-socket joints $j'$, made for lateral adjustment, ball-and-socket joints $j^2$ for vertical adjustment, and the connecting-nipples N.

The operation of my improved coupler made as herein described is as follows: The steam-pipe at each end of the cars being provided with the coupler part C and there being a short pipe constructed with an adjustable joint between its ends and with each of the latter constructed with a coupler part C², as the cars approach each other, the coupler parts C² on each end of the short pipe being entered into the coupler part C on the steam-pipes of the cars, the levers L are operated to connect the coupler parts, as before described. When it is desired to separate the cars, the coupler parts between one of the ends of the short pipe and the adjacent car are disconnected by a chain, as before described, or by hand, and as the cars separate the short pipe remains connected to one of the cars.

Having thus described my invention, what I claim, and desire to secure by Letters Patent, is—

The combination, with the steam-pipes, of a coupling consisting of a receiving member interiorly recessed to form an annular tapering surface E', an entering member of tapering form projecting into the receiving member beyond the tapering surface E', a bifurcated lever fulcrumed upon the receiving member C and provided on each side with a jaw formed with a cam-surface to engage with a pin projecting from the member C², a weight at the free end of the lever, and an exterior pin-and-slot engagement of the members C and C², substantially as set forth.

Signed at Troy, New York, this 15th day of June, 1889, and in the presence of two witnesses whose names are hereto written.

MICHAEL KENNEDY.

Witnesses:
CHARLES S. BRINTNALL,
W. E. HAGAN.